US012809547B2

(12) United States Patent
Lien et al.

(10) Patent No.: US 12,809,547 B2
(45) Date of Patent: *Nov. 24, 2026

(54) DYNAMIC READ LEVEL TRIM SELECTION FOR SCAN OPERATIONS OF MEMORY DEVICES

(71) Applicant: MICRON TECHNOLOGY, INC., Boise, ID (US)

(72) Inventors: Yu-Chung Lien, San Jose, CA (US); Li-Te Chang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,596

(22) Filed: Feb. 3, 2025

(65) Prior Publication Data

US 2025/0181267 A1 Jun. 5, 2025

Related U.S. Application Data

(63) Continuation of application No. 17/830,802, filed on Jun. 2, 2022, now Pat. No. 12,248,697.

(51) Int. Cl.
*G06F 3/06* (2006.01)

(52) U.S. Cl.
CPC .......... *G06F 3/0655* (2013.01); *G06F 3/0604* (2013.01); *G06F 3/0644* (2013.01); *G06F 3/0679* (2013.01)

(58) Field of Classification Search
CPC .... G06F 3/0655; G06F 3/0679; G06F 3/0644; G06F 3/0604
See application file for complete search history.

(56) References Cited

U.S. PATENT DOCUMENTS

| | | | | |
|---|---|---|---|---|
| 9,606,864 | B2 | 3/2017 | Lee et al. | |
| 9,761,308 | B1 | 9/2017 | Cometti | |
| 10,102,920 | B2 | 10/2018 | Reusswig et al. | |
| 11,189,350 | B2 | 11/2021 | Jeon | |
| 11,941,293 | B2 * | 3/2024 | Kang | G06F 3/0604 |
| 2014/0043903 | A1 | 2/2014 | Ok et al. | |
| 2015/0019934 | A1 | 1/2015 | Chae | |
| 2019/0243734 | A1 * | 8/2019 | Kim | G06F 3/0647 |
| 2019/0325969 | A1 | 10/2019 | Hong | |
| 2021/0055878 | A1 * | 2/2021 | Iwasaki | G06F 12/10 |
| 2022/0406382 | A1 | 12/2022 | Komatsu et al. | |

* cited by examiner

*Primary Examiner* — Mark A Giardino, Jr.
(74) *Attorney, Agent, or Firm* — Lowenstein Sandler LLP

(57) ABSTRACT

A memory page scan on a memory page of a plurality of memory pages of a memory device is initiated. Whether an update trim flag is set is determined. A set update trim flag indicates that a second trim value is to be used for the memory page scan. A cleared update trim flag indicates that a first trim value is to be used for the memory page scan. The update trim flag is set based on a data state metric associated with a first page read and a data state metric associated with a second page read.

20 Claims, 5 Drawing Sheets

DYNAMIC READ LEVEL TRIM SELECTION FOR SCAN OPERATIONS OF MEMORY DEVICES

RELATED APPLICATIONS

This application is a continuation application of U.S. patent application Ser. No. 17/830,802, filed Jun. 2, 2022, entitled "DYNAMIC READ LEVEL TRIM SELECTION FOR SCAN OPERATIONS OF MEMORY DEVICES", the contents of which are incorporated by reference in its entirety herein.

TECHNICAL FIELD

Embodiments of the disclosure relate generally to memory sub-systems, and more specifically, relate to dynamic read level trim selection for scan operations of memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
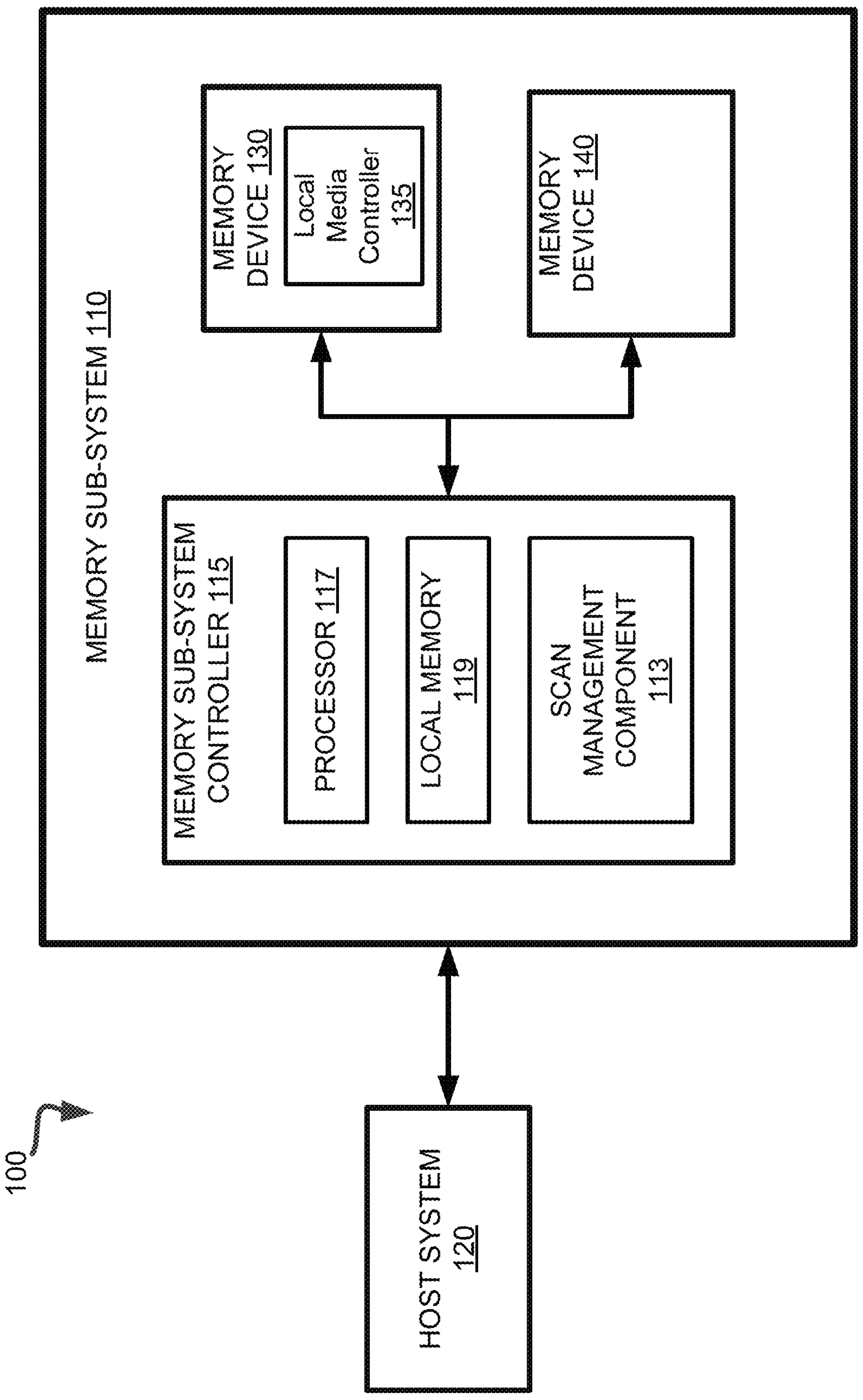
FIG. 1 illustrates an example computing system that includes a memory sub-system in accordance with some embodiments of the present disclosure.

Aspects of the present disclosure are directed to dynamic read level trim selection for scan operations of memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative- and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A single-level cell (SLC) can store only one bit per memory element, whereas a multi-level cell (MLC) is a memory element that is capable of storing more than a single bit of information. It should be noted that the state of the memory cell can be programmed and the state of the memory can be determined by comparing a read voltage of the memory cell against one or more read level thresholds. That is, with SLC NAND flash technology, each cell can exist in one of two states, storing one bit of information per cell, whereas MLC NAND flash memory has four or more possible states per cell, so each MLC-based cell can store two or more bits of information per cell. The higher number of possible states reduces the amount of margin (e.g., valley margin or voltage range) separating the states. The memory device can include triple-level cell (TLC) memory. In TLC memory, the memory cell stores three bits of information per cell with eight total voltage states. The memory device can include a quad-level cell (QLC) memory. In QLC memory, each memory cell can store four bits of information with sixteen voltage states. For example, in a QLC memory, a memory cell can store four bits of data (e.g., 1111, 0000, 1101, etc.) corresponding to data received from the host system using the sixteen voltage states. It can be noted that operations herein can be applied to any multi-bit memory cells.

Each bit of the memory cell is stored at a different portion (also referred to as "logical page" hereafter) of the memory cell. Various read level thresholds can be used for the various logical page types (also referred to as "page types" herein): SLC logical page types are lower logical pages (LPs), MLC logical page types are LPs, and upper logical pages (UPs), TLC logical page types are LPs, UPs, and extra logical pages (XPs), and QLC logical page types are LPs, UPs, XPs and top logical pages (TPs). For example, a memory cell of the QLC memory can have a total of four logical pages, including a lower logical page (LP), an upper logical page (UP), an extra logical page (XP), and a top logical page (TP), where each logical page stores a bit of data. For example, a bit can be represented by each of the four logical pages of the memory cell. In a memory cell for QLC memory, each combination of four bits can correspond to a different voltage level (also referred to as "level" hereafter). For example, a first level of the memory cell can correspond to 1111, a second level can correspond to 0111, and so on. Because a memory cell for a QLC memory includes 4 bits of data, there are a total of 16 possible combinations of the four bits of data. Accordingly, a memory cell for a QLC memory can be programmed to one of 16 different levels.

In embodiments, the memory system receives a request from a host system to perform a programming operation to store data at the QLC memory (or other memory components having memory cells that store two or more bits). The memory system can store the data by performing multi-pass programming (e.g., two or more programming passes) that programs or stores data at the memory cell. A first programming pass can program data at the memory cell at a particular time. At a later time, a second programming pass can be performed on the memory cell to store additional data at the memory cell. The second programming pass uses the information stored in the first programming pass. A certain amount of time can elapse between the memory sub-system performing the first programming pass and performing the second programming pass on the same memory cell. During a first programming pass of a two-pass programming operation, one or more voltage levels can be applied to the memory cell to program a first set of bits (e.g., 3 bits in 3 logical pages). During a second programming pass of the two-pass programming operation, one or more voltage levels can be applied to the memory cell to program an additional bit to the first set of bits (e.g., 4 bits in 4 logical pages). The level to which the memory cell is programmed in the second programming pass can be based on the last logical page of the memory cell, as well as the prior logical pages that were programmed at the memory cell in the first programming pass.

A continuous read level calibration (cRLC) operation continuously samples valley margins between programming distributions. The valley margin can refer to a relative width (also referred to as "margin" herein) between pairs of adjacent programming distributions. For example, valley margins associated with a particular logical page type can indicate the relative width between pairs of programming distributions associated with the particular logical page type. For instance, a first valley margin of an upper logical page (e.g., valley 2 that is between the 2nd distribution (L1) and 3rd distribution (L2)) that is larger than a second valley margin of the upper logical page (e.g., valley 6 that is between the 6th distribution (L5) and the 7th distribution (L6)) can indicate that the first valley is larger than the second valley (e.g., valley 2 is larger than valley 3), but does not explicitly recite the absolute width or size of either valley.

Valley margin can be correlated with a read window budget (RWB). Read window budget for a valley can refer to an absolute measurement in volts (e.g., millivolts (mV)) between two adjacent programming distributions. For example, the RWB for valley 2 can be 270 mV and the RWB for valley 6 can be 250 mV. If, for example, the first valley margin is larger than the second valley margin, then a correlation that the RWB of the first valley margin is larger than the RWB of the second valley margin can be made.

In some instances, a value for RWB is not readily measureable. A difference error count (Diff-EC) can be readily measured (e.g., by the cRLC operation) and can be correlated to a valley margin and relative RWB of valleys for a particular logical page type. Diff-EC is a metric derived from measurements taken at a valley between two adjacent programming distributions. In some embodiments, Diff-EC is inversely proportional to valley margin. For example, two valleys of a particular logical page type with the same Diff-EC value have approximately the same valley margin. Since the two valleys have the same valley margin, it can be inferred that the two valleys have approximately the same RWB, even though the absolute RWB is not measured. If a first valley of a first logical page type has a higher Diff-EC than a second valley of the first logical page type, it can be inferred that the first valley has less valley margin than the second valley, and that the first valley has less RWB than the second valley. The cRLC operation measures and collects additional information about the valley margins to determine metrics such as the center error count (CenterEC) (also referred to as the "center bit error count" or "center sample bit error count" herein). CenterEC is a metric indicative of the bit error count (e.g., number of bit errors) for the center sample of each trim (e.g., each read level threshold) for a particular logical page type.

The cRLC operation is a read level calibration that can be done for each of the multiple read level threshold registers used during all read operations. A read level threshold register can store a value that indicates the read level threshold voltage for a particular valley. The cRLC operation can be performed to keep each read level threshold centered so that the memory component can achieve the best overall bit error rate (BER) possible. The cRLC operation is referred to as continuous because the operation samples continually and dynamically at discrete intervals. For example, a sample, which can be a set of three reads, can be made at about 1 sample operation in every 1 to 30 seconds, depending on the requirements. Each sample initiated by the cRLC operation returns data for a particular die and a particular logical page type so that over many of these operations the information is aggregated and fed back in a closed loop system such that each die or read level threshold is kept calibrated (e.g., the read level threshold is centered). In one implementation, a sample is three reads from the same read threshold valley (e.g., also referred to as "valley" or "Vt distribution valley" herein). The read level thresholds of the memory component can start with manufacturing default read level thresholds (or default read level trim) directed towards data retention.

The cRLC operation can be run during a test mode, prior to operations of the memory device, so that all read level offset trims of all word line groups (WLGs) of all dies in the memory system are calibrated (also referred to as "converged" herein). A memory cell (or WLG or memory component, etc.) that is calibrated or converged by cRLC has a center value that corresponds to a read level threshold (or calibrated read level trim) that is centered in or at a lowest point in the read threshold valley. A memory cell (or WLG or memory component, etc.) that is calibrated or converged by cRLC has a center value that results in a lowest bit error rate (BER). BER can refer to a ratio of a number of bits in error of a data vector divided by a total number of bits for the given data vector. BER can correspond to a particular logical page type. For example, a particular logical page type has a particular BER and another logical page type has another BER. A trim can refer to digital value that is used for a circuit, such as a register, that is converted into an analog voltage value. For example, the read level threshold trims can be programmed into a trim register, which produces a read level threshold voltage used to read data from a memory cell.

The speed of memory degradation is highly dependent on the number of program erase cycles (PEC) associated with the memory device. The number of PEC refers to the number of times a group of memory cells is erased and subsequently programmed with new data. Toward the memory device's end of life, as the memory device's PEC increases, memory degradation can occur more aggressively. In order to mitigate the memory degradation, data integrity check operations (also referred to herein as "scan operations") can be periodically performed on the memory device. The data integrity check can involve evaluating one or more data state metrics on one or more blocks of the memory device. Should the data integrity check indicate that one or more data state metrics fail to satisfy respective quality criteria (e.g., the RBER exceeds a predefined threshold, the bit error count per page exceeds a predefined threshold, and/or the valley width of a particular threshold level exceeds a predefined threshold), a cRLC calibration using a read sample offset (RSO) operation is performed (e.g., a deep check). In particular, multiple reads are performed at varying offsets, generally referred to as left, right, and center samples or strobes, to read the data of the memory sub-system. Each of these reads is of the same data and each returns an error count associated with the data. Placement of the RSO strobes relative to the valleys of the programming distributions can impact the quality of the sampling. The left and right strobes are placed at fixed equidistance offsets relative to the center strobe (e.g., the respective distances between the left strobe and the center strobe and the right strobe and the center strobe are equal), without consideration of the shape of the valley. However, the shape of the valley can affect the optimal placement of the RSO strobes and can produce an undesirable error count. For example, the shape of the valley can result in a placement of a center strobe of an RSO operation being placed on a sidewall of a distribution, and not in a read threshold valley.

Once the deep check is performed, a decision tree operation may be performed. The decision tree operation can involve evaluating one or more additional data state metrics associated with the one or more blocks of the memory. Should the decision tree operation indicate that the additional one or more additional data state metrics fail to satisfy one or more additional criterias (e.g., the Diff-EC associated with the one or more block matches or exceeds a predefined Diff-EC threshold level or CenterEC exceeds a predefined CenterEC threshold level), one or more media management operations can be performed on the affected blocks to mitigate the detected memory degradation. In an illustrative example, the media management operations can include refresh, or "folding," operations, which involve relocating the data stored at an affected block of the memory device to another block.

In conventional memory sub-systems, the frequency of the scan operations can be performed based on the predefined thresholds for the data state metrics that dictate whether media management operations are to be performed. In conventional memory sub-systems, the predefined thresholds are based on end-of-life specifications of the memory device. That is, conventional memory sub-systems define the predefined data state metric thresholds based on specifications reported at the end-of-life of a memory device. For example, conventional memory sub-systems can perform memory characterizations that determine an error rate at or near the end-of-life of a memory device, and based on that error rate, can determine the predefined data state metric thresholds to use throughout the entire life of the memory device.

In conventional memory sub-systems, the longer the data written to a memory component remains stagnant (e.g., not refreshed and/or rewritten) in the memory component (e.g., baking), the more data within the memory component degrades. Due to the data remaining stagnant in the memory component and degrading overtime (e.g., baking), when performing read operations using the calibrated read level trim to read the data from the memory component the data state metric increases. Thus, based on this increase in data state metrics due to baking, the memory component containing the baked data will like experience over-scanning and/or over-folding, which can result in reduced performance of the memory device, and can affect the quality of service (QOS) of the memory device.

Aspects of the present disclosure address the above and other deficiencies by having a memory sub-system that transitions from using a calibrated read level trim to a default read level trim to prevent over-scanning and/or over-folding of the memory component. The calibrated read level trim provides an optimal read level for read operations. The default read level trim is directed towards tolerating data retention. In particular, the memory sub-system performs a read operation on a page of a block of the memory device using the calibrated read level trim. The memory sub-system determines whether a data state metric associated with the read operation using the calibrated read level trim satisfies a respective quality criteria (e.g., a predetermined threshold).

Based on the data state metric associated with the read operation using the calibrated read level trim not satisfying the respective quality criteria, the memory sub-system performs another read operation on the page of the block of the memory device using the default read level trim. The memory sub-system determines whether a data state metric associated with the another read operation using the default read level trim satisfies the respective quality criteria. Based on the data state metric associated with the read operation using the default read level trim not satisfying the respective quality criteria, the memory sub-system may proceed with performing a media management operation (e.g., a folding operation).

Based on the data state metric associated with the read operation using the default read level trim satisfying the respective quality criteria, the memory sub-system may transition from using the calibrated read level trim to using the default read level trim to perform further read operations. The memory sub-system determines whether the data state metric associated with the additional read operations does not satisfy the respective quality criteria to perform media management operations.

Advantages of the present disclosure include, but are not limited to, preventing over-scanning and/or over-folding through the lifetime of a memory device while providing reliability to the memory device. By adaptively transitioning from using the calibrated read level trim during the early stages of baking to the default read level trim directed towards data retention during later stages of baking.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative- and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative- or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a scan management component 113 that can perform dynamic read level trim selection for scan operations of memory devices. In some embodiments, the memory sub-system controller 115 includes at least a portion of the scan management component 113. In some embodiments, the scan management component 113 is part of the host system 110, an application, or an operating system. In other embodiments, local media controller 135 includes at least a portion of scan management component 113 and is configured to perform the functionality described herein.

The scan management component 113 identifies a data integrity threshold value and a set of trim values from the memory sub-system controller 115. The set of trim values includes a default read level trim and a calibrated read level trim. The scan management component 113 may initiate a scan operation on a page of a block of memory block 130 and/or 140. Responsive to determining that the page is not empty, the scan management component 113 performs a read operation on the page using the calibrated read level trim. The scan management component 113 obtains a data state metric associated with the read operation on the page using the calibrated read level trim. The scan management component 113 determines whether the data state metric fails to satisfy the data integrity threshold value.

Responsive to determining that the data state metric fails to satisfy the data integrity threshold value, the scan management component 113 performs another read operation on the page using the default read level trim instead of the calibrated read level trim. The scan management component 113 obtains a data state metric associated with the read operation on the page using the default read level trim. The scan management component 113 determines whether the data state metric fails to satisfy the data integrity threshold value to perform a media management operation (e.g., folding operation) on the block. Responsive to determining that the data state metric satisfies the data integrity threshold value, the scan management component 113 transitions further read operations associated with the page scan to solely use the default read level trim to determine, based on a corresponding data state metric, whether the corresponding data state metric fails to satisfy the data integrity threshold value to perform a media management operation (e.g., folding operation). However, if the data state metric associated with the read operation on the page using the default read level trim fails to satisfy the data integrity threshold value, the scan management component 113 performs a media management operation on the block. Further details with regards to the operations of the scan management component 113 are described below.

Figure 2:
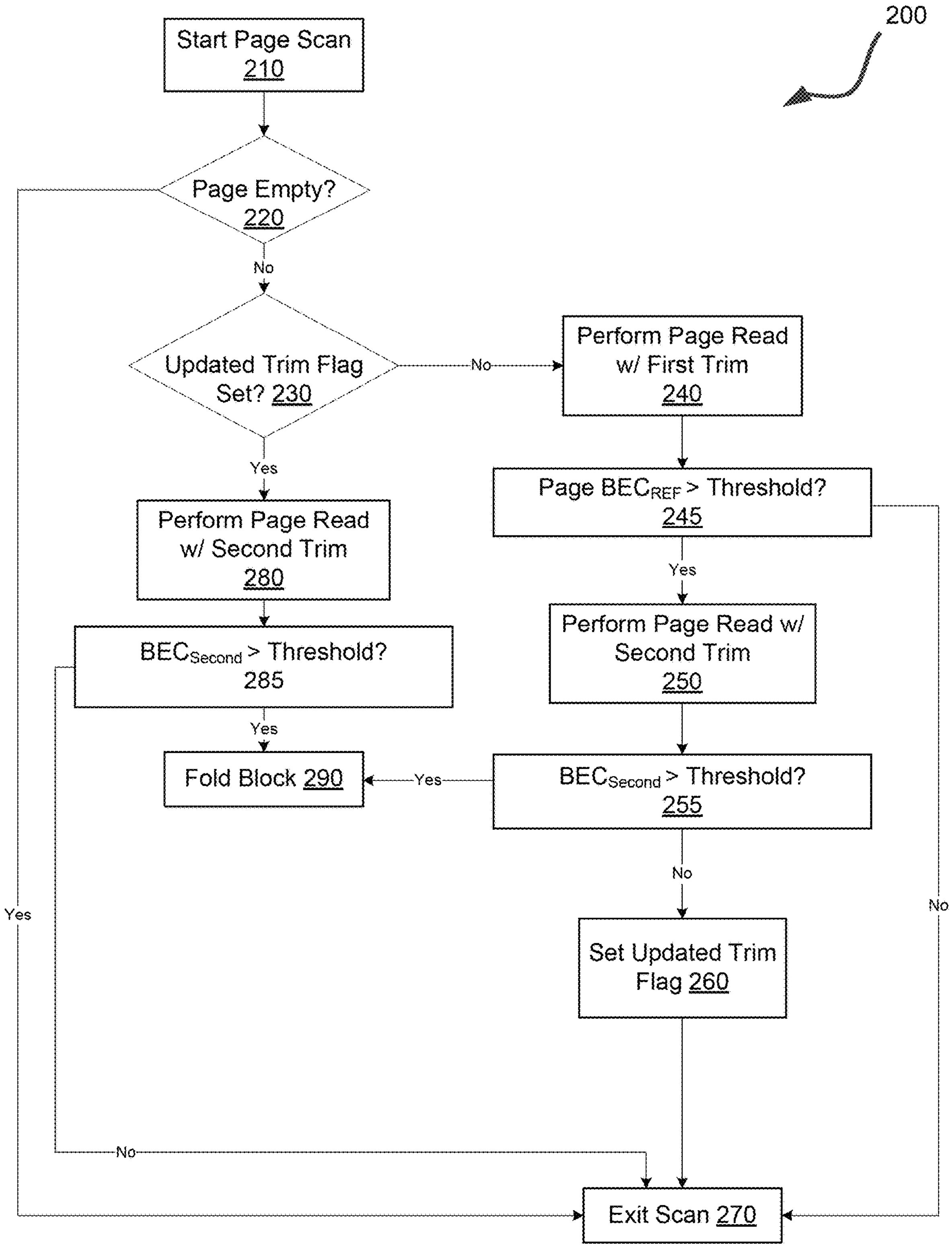
FIG. 2 is a flow diagram of an example of dynamic read level trim selection for scan operations of memory devices, in accordance with some embodiments of the present disclosure.

FIG. 2 is a flow diagram of an example method 200 to improve media scan reliability of memory devices, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the scan management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic scans a page of a block (e.g., performs a scan operation). At operation 220, the processing logic determines if the page is empty. Responsive to determining that the page is empty, at operation 270, the processing logic exits the page scan. Responsive to determining that the page is not empty, at operation 230, the processing logic determines whether an updated trim flag is set. Initially, the updated trim flag is not set, indicating that the scan operation is using a first trim for page reads (e.g., read operations on the page). Once it is determined that the updated trim flag is not set, at operation 240, the processing logic performs a page read using a first trim. As previously described, the first trim (e.g., calibrated read level trim) is a read level trim generated from calibrating all read level offset trims of all word line groups (WLGs) of all dies in the memory system. A data state metric associated with the page read using the first trim is obtained in response to the page read. As previously described, the data state metric may be a RBER of the page or a bit error count of the page. At operation 245, the processing logic determines whether the data state metric associated with the page read using the first trim exceeds a threshold value. As previously described, the threshold value (e.g., predefined data state metric thresholds) is based on a memory characterization that determines an error rate at or near the end-of-life of a memory device to be used throughout the entire life of the memory device. Responsive to determining that the data state metric associated with the page read using the first trim exceeds the threshold value, at operation 250, the processing logic performs a page read using a second trim. The second trim is a predefined read level trim generated from provided during manufacturing. A data state metric associated with the page read using the second trim is obtained in response to the page read.

At operation 255, the processing logic determines whether the data state metric associated with the page read using the second trim exceeds a threshold value. Responsive to determining that the data state metric associated with the page read using the second trim exceeds the threshold value, at operation 290, the processing logic performs a media management operations (e.g., a folding operation to fold the block). In particular, as previously described, to perform the media management operation, a deep check and/or a decision tree operation is performed to determine whether to perform the media management operation. Responsive to determining that the data state metric associated with the page read using the second trim does not exceed the threshold value, at operation 260, the processing logic sets an updated trim flag indicating that further page scans of the block should transition from using the first trim to perform page reads to using a second trim to perform the page reads. Once the updated trim flag is set, at operation 270, the processing logic exits the page scan.

Once it is determined that the update trim flag is set, at operation 280, the processing logic performs a page read using a second trim. In response to the page read, a data state metric associated with the page read using the second trim is obtained. At operation 285, the processing logic determines whether the data state metric associated with the page read using the second trim exceeds a threshold value. Responsive to determining that the data state metric associated with the page read using the second trim exceeds the threshold value, at operation 290, the processing logic performs media management operations (e.g., a folding operation to fold the block). In particular, as previously described, to perform the media management operation, a deep check and/or a decision tree operation is performed to determine whether to perform the media management operation. Responsive to determining that the data state metric associated with the page read using the second trim does not exceed the threshold value, at operation 270, the processing logic exits the page scan.

Figure 3:
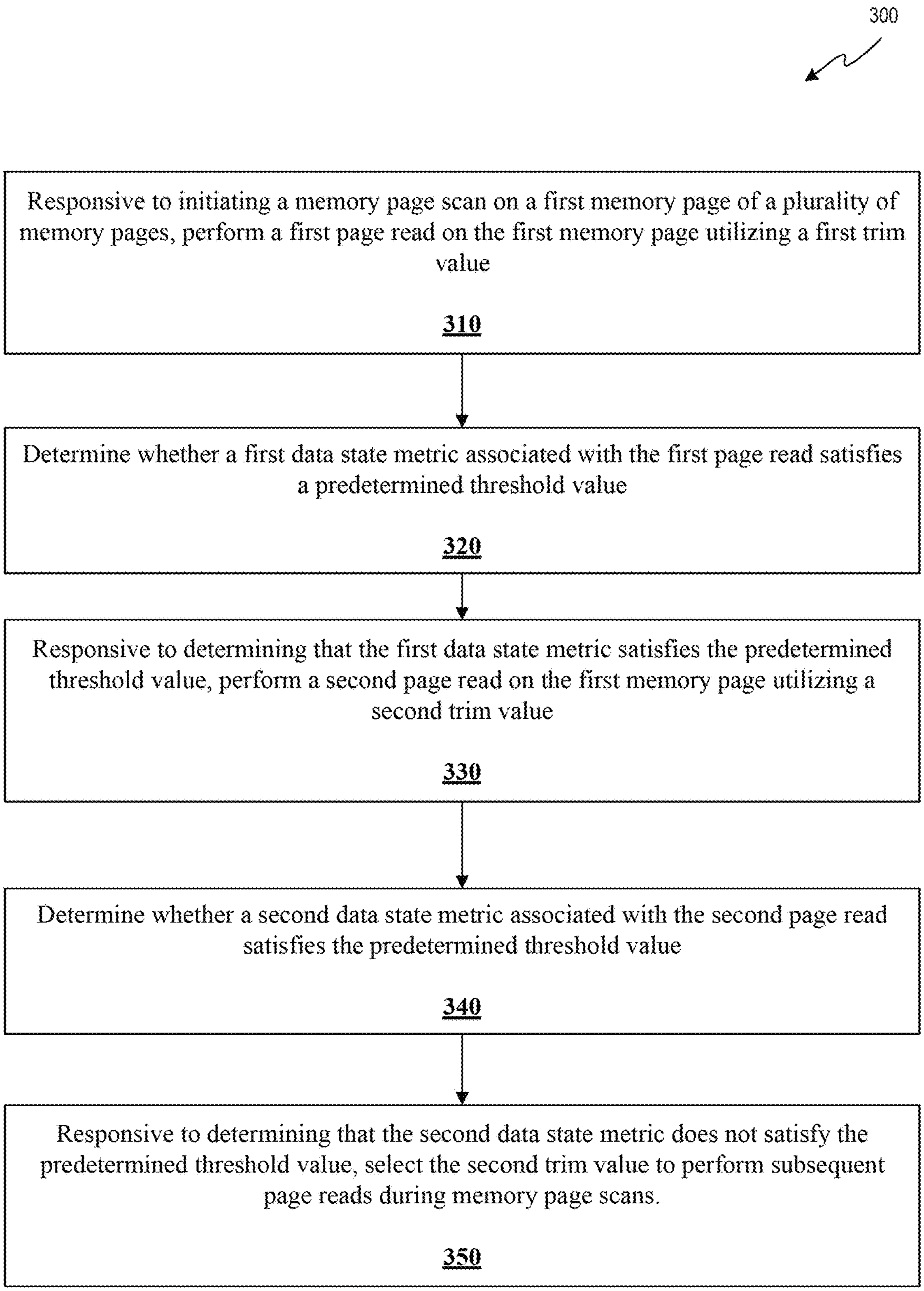
FIG. 3 is a flow diagram of an example method of dynamic read level trim selection for scan operations of memory devices, in accordance with some embodiments of the present disclosure.

FIG. 3 is a flow diagram of an example method 300 to improve media scan reliability of memory devices, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the scan management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, responsive to initiating a memory page scan on a first memory page of a plurality of memory pages, the processing logic performs a first page read (e.g., not empty) on the first memory page utilizing a first trim value.

At operation 320, the processing logic determines whether a first data state metric associated with the first page read satisfies a predetermined threshold value. At operation 330, responsive to determining that the first data state metric satisfies the predetermined threshold value, the processing logic a second page read on the first memory page utilizing a second trim value.

At operation 340, the processing logic determines whether a second data state metric associated with the second page read satisfies the predetermined threshold value. At operation 350, responsive to determining that the second data state metric does not satisfy the predetermined threshold value, the processing logic selects the second trim value to perform subsequent page reads during memory page scans. In some embodiments, responsive to determining that the second data state metric satisfies the predetermined threshold value, the processing logic performs a media management operation on a block associated with the page. The media management operation is a folding operation.

In some embodiments, the processing logic initiates a subsequent memory page scan on a second memory page of the plurality of memory pages. Responsive to selecting the second trim value to perform subsequent page reads during memory page scans, the processing logic performs a third page read on the second memory page utilizing the second trim value. Responsive to determining that a third data state metric associated with the third page read satisfies the predetermined threshold value, the processing logic performs a media management operation on a block associated with the subsequent page. Responsive to determining that a third data state metric associated with the third page read does not satisfy the predetermined threshold value, the processing logic exits (e.g., terminates) the memory page scan of the subsequent page.

Figure 4:
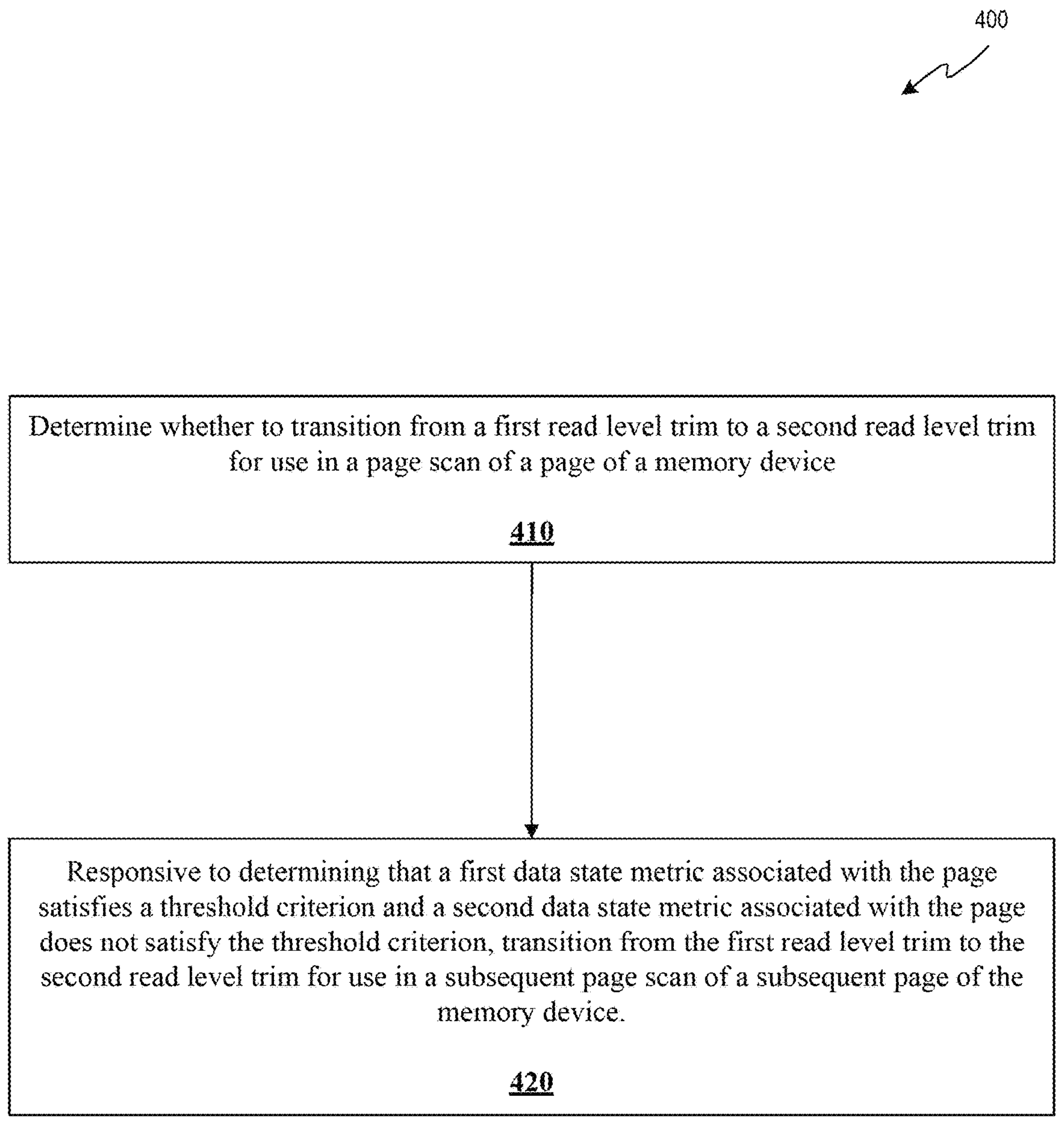
FIG. 4 is a flow diagram of an example method of dynamic read level trim selection for scan operations of memory devices, in accordance with some embodiments of the present disclosure.

FIG. 4 is a flow diagram of an example method 400 to improve media scan reliability of memory devices, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the scan management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic determines whether to transition from a first read level trim to a second read level trim for use in a page scan of a page of a memory device. At operation 420, responsive to determining that a first data state metric associated with the page satisfies a threshold criterion and a second data state metric associated with the page does not satisfy the threshold criterion, the processing logic transitions from the first read level trim to the second read level trim for use in a subsequent page scan of a subsequent page of the memory device. The first data state metric associated with the page is a data state metric associated with a read operation performed on the page using the first read level trim. The second data state metric associated with the page is a data state metric associated with a read operation performed on the page using the second read level trim.

In some embodiments, responsive to determining that the first data state metric associated with the page satisfies the threshold criterion and the second data state metric associated with the page satisfies the threshold criterion, the processing logic performs a media management operation (e.g., folding operation) on the block associated with the page.

In some embodiments, responsive to initiating the subsequent page scan of the subsequent page of the memory device, the processing logic determines whether a third data state metric satisfies the threshold criterion. The third data state metric is a data state metric associated with a read operation performed on the page using the second read level trim. Responsive to determining that the third data state metric satisfies the second threshold criterion, the processing logic performs a media management operation on the block associated with the subsequent page.

Figure 5:
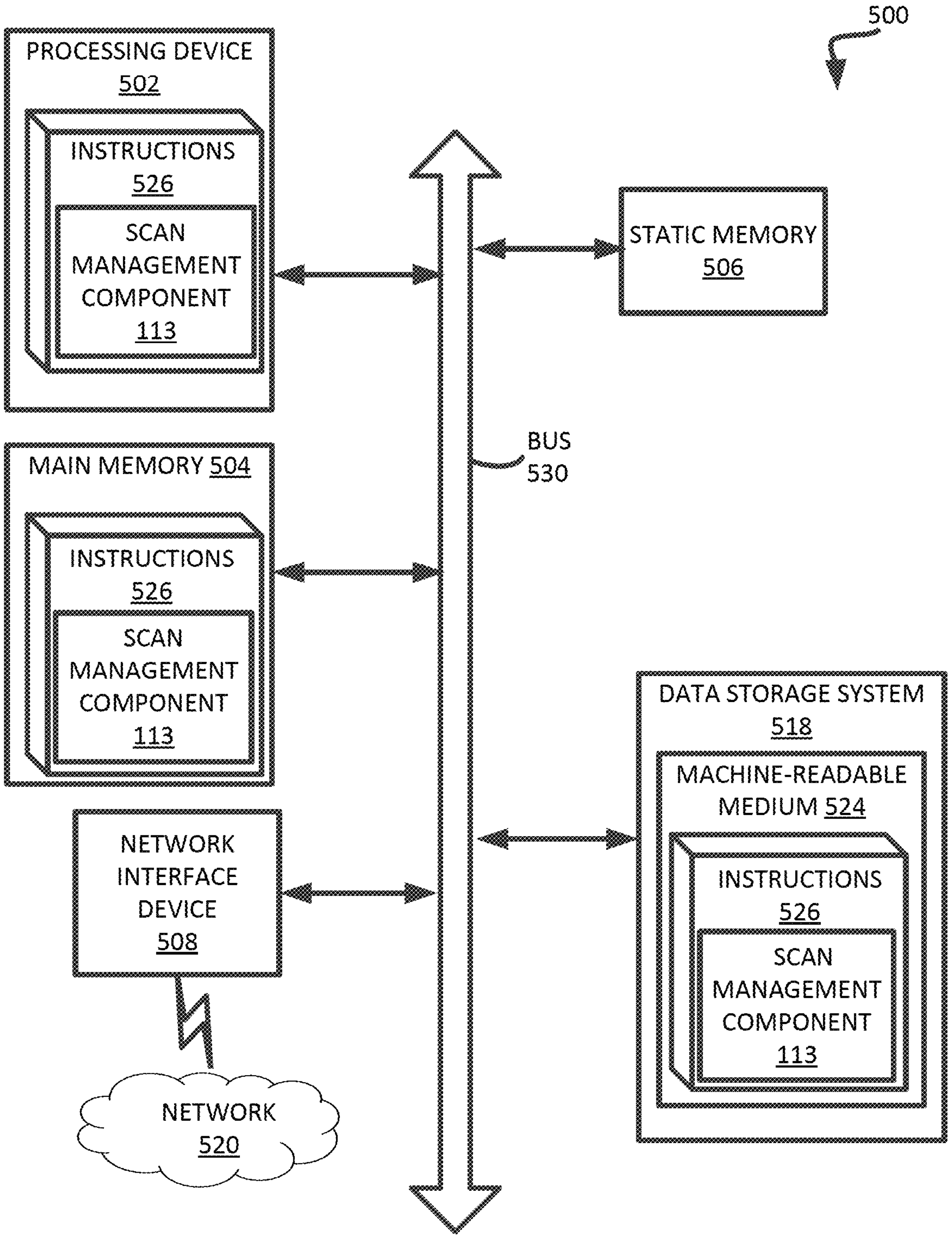
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the scan management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a Scan management component (e.g., the scan management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

initiating a memory page scan on a memory page of a plurality of memory pages of a memory device;

determining that an update trim flag is not set; and responsive to determining that the update trim flag is not set, setting, based on a data state metric associated with a first page read using a calibrated read level trim and a data state metric associated with a second page read using a default read level trim, the update trim flag, wherein setting the update trim flag causes a transition from using the calibrated read level trim to using the default read level trim for subsequent memory page scans.

2. The method of claim 1, wherein setting, based on the data state metric associated with the first page read using the calibrated read level trim and the data state metric associated with the second page read using the default read level trim, the update trim flag comprises:

performing the memory page scan using the calibrated read level trim.

3. The method of claim 2, wherein setting, based on the data state metric associated with the first page read using the calibrated read level trim and the data state metric associated with the second page read using the default read level trim, the update trim flag further comprises:

determining whether the data state metric associated with the first page read satisfies a predetermined threshold value, wherein exceeding the predetermined threshold value indicates that the memory device is at or near end-of-life;

responsive to determining that the data state metric associated with the first page read satisfies the predetermined threshold value, performing the second page read on the memory page utilizing the default read level trim to determine whether the default read level trim should be used for subsequent memory page scans;

determining whether the data state metric associated with the second page read, satisfies the predetermined threshold value; and responsive to determining that the data state metric associated with the second page read does not satisfy the predetermined threshold value, setting the update trim flag.

4. The method of claim 3, wherein setting, based on the data state metric associated with the first page read using the calibrated read level trim and the data state metric associated with the second page read using the default read level trim, the update trim flag further comprises:

responsive to determining that the data state metric associated with the second page read satisfies the predetermined threshold value, performing a folding operation.

5. The method of claim 4, further comprising:

determining whether the data state metric associated with the second page read, satisfies the predetermined threshold value; and responsive to determining that the data state metric associated with the second page read satisfies the predetermined threshold value, performing a folding operation.

6. The method of claim 1, further comprising:

responsive to determining that the update trim flag is set, performing the memory page scan using the default read level trim.

7. The method of claim 1, wherein determining that the update trim flag is not set comprises:

determining that the memory page is not empty.

8. A system comprising:

a memory device; and a processing device, operatively coupled with the memory device, to perform operations comprising:

initiating a memory page scan on a memory page of a plurality of memory pages of the memory device; and responsive to determining that an update trim flag is not set, setting, based on a data state metric associated with a first page read using a calibrated read level trim and a data state metric associated with a second page read using a default read level trim, the update trim flag, wherein setting the update trim flag causes a transition from using the calibrated read level trim to using the default read level trim for subsequent memory page scans.

9. The system of claim 8, wherein setting, based on the data state metric associated with the first page read using the calibrated read level trim and the data state metric associated with the second page read using the default read level trim, the update trim flag comprises:

performing the memory page scan using the calibrated read level trim.

10. The system of claim 9, wherein setting, based on the data state metric associated with the first page read using the calibrated read level trim and the data state metric associated with the second page read using the default read level trim, the update trim flag further comprises:

determining whether the data state metric associated with the first page read satisfies a predetermined threshold value, wherein exceeding the predetermined threshold value indicates that the memory device is at or near end-of-life;

responsive to determining that the data state metric associated with the first page read satisfies the predetermined threshold value, performing the second page read on the memory page utilizing the default read level trim to determine whether the default read level trim should be used for subsequent memory page scans;

determining whether the data state metric associated with the second page read, satisfies the predetermined threshold value; and responsive to determining that the data state metric associated with the second page read does not satisfy the predetermined threshold value, setting the update trim flag.

11. The system of claim 10, wherein setting, based on the data state metric associated with the first page read using the calibrated read level trim and the data state metric associated with the second page read using the default read level trim, the update trim flag further comprises:

responsive to determining that the data state metric associated with the second page read satisfies the predetermined threshold value, performing a folding operation.

12. The system of claim 11, wherein the processing device is to further perform operations comprising:

determining whether the data state metric associated with the second page read, satisfies the predetermined threshold value; and responsive to determining that the data state metric associated with the second page read satisfies the predetermined threshold value, performing a folding operation.

13. The system of claim 8, wherein the processing device is to further perform operations comprising:

responsive to determining that the update trim flag is set, performing the memory page scan using the default read level trim.

14. The system of claim 8, wherein determining that the update trim flag is not set comprises:

determining that the memory page is not empty.

15. A non-transitory computer-readable storage medium comprising instructions that, when executed by a processing device, cause the processing device to perform operations comprising:

initiating a memory page scan on a memory page of a plurality of memory pages of a memory device; and responsive to determining that an update trim flag is not set, setting, based on a data state metric associated with a first page read using a calibrated read level trim and a data state metric associated with a second page read using a default read level trim, the update trim flag, wherein setting the update trim flag causes a transition from using the calibrated read level trim to using the default read level trim for subsequent memory page scans.

16. The non-transitory computer-readable storage medium of claim 15, wherein setting, based on the data state metric associated with the first page read using the calibrated read level trim and the data state metric associated with the second page read using the default read level trim, the update trim flag comprises:

performing the memory page scan using the calibrated read level trim.

17. The non-transitory computer-readable storage medium of claim 16, wherein setting, based on the data state metric associated with the first page read using the calibrated read level trim and the data state metric associated with the second page read using the default read level trim, the update trim flag further comprises determining whether the data state metric associated with the first page read satisfies a predetermined threshold value, wherein exceeding the predetermined threshold value indicates that the memory device is at or near end-of-life;

responsive to determining that the data state metric associated with the first page read satisfies the predetermined threshold value, performing the second page read on the memory page utilizing the default read level trim to determine whether the default read level trim should be used for subsequent memory page scans;

determining whether the data state metric associated with the second page read, satisfies the predetermined threshold value; and responsive to determining that the data state metric associated with the second page read does not satisfy the predetermined threshold value, setting the update trim flag.

18. The non-transitory computer-readable storage medium of claim 17, wherein setting, based on the data state metric associated with the first page read using the calibrated read level trim and the data state metric associated with the second page read using the default read level trim, the update trim flag further comprises:

responsive to determining that the data state metric associated with the second page read satisfies the predetermined threshold value, performing a folding operation.

19. The non-transitory computer-readable storage medium of claim 18, further causing the processing device to perform operations comprising:

determining whether the data state metric associated with the second page read, satisfies the predetermined threshold value; and responsive to determining that the data state metric associated with the second page read satisfies the predetermined threshold value, performing a folding operation.

20. The non-transitory computer-readable storage medium of claim 15, further causing the processing device to perform operations comprising:

responsive to determining that the update trim flag is set, performing the memory page scan using the default read level trim.

* * * * *